United States Patent
Weiberle et al.

(10) Patent No.: US 8,219,796 B2
(45) Date of Patent: Jul. 10, 2012

(54) METHOD AND DEVICE FOR CONTROLLING A COMPUTER SYSTEM

(75) Inventors: Reinhard Weiberle, Vaihingen/Enz (DE); Bernd Mueller, Leonberg-Silberberg (DE); Eberhard Boehl, Reutlingen (DE); Yorck von Collani, Beilstein (DE); Rainer Gmehlich, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 518 days.

(21) Appl. No.: 12/063,250

(22) PCT Filed: Jul. 26, 2006

(86) PCT No.: PCT/EP2006/064663
§ 371 (c)(1), (2), (4) Date: Aug. 30, 2010

(87) PCT Pub. No.: WO2007/017378
PCT Pub. Date: Feb. 15, 2007

(65) Prior Publication Data
US 2011/0125997 A1 May 26, 2011

(30) Foreign Application Priority Data
Aug. 8, 2005 (DE) .................. 10 2005 037 228

(51) Int. Cl.
*G06F 9/00* (2006.01)
*G06F 1/04* (2006.01)
*G06F 15/16* (2006.01)
*G06F 15/167* (2006.01)
*G06F 12/00* (2006.01)
*G06F 15/00* (2006.01)
*G06F 11/00* (2006.01)

(52) U.S. Cl. ............ 713/100; 713/1; 713/375; 709/208; 709/213; 711/147; 712/28; 712/32; 714/10

(58) Field of Classification Search .............. 713/1, 100, 713/375; 709/208, 213; 711/147; 712/28, 712/32; 714/10
See application file for complete search history.

(56) References Cited

U.S. PATENT DOCUMENTS

| 6,615,366 B1 | 9/2003 | Grochowski et al. |
| 6,625,756 B1 * | 9/2003 | Grochowski et al. ........... 714/17 |
| 6,640,313 B1 * | 10/2003 | Quach ............................. 714/10 |
| 6,772,368 B2 * | 8/2004 | Dhong et al. ................... 714/11 |
| 6,954,886 B2 * | 10/2005 | Tu et al. ........................ 714/726 |

(Continued)

FOREIGN PATENT DOCUMENTS
DE 103 49 581 5/2005
(Continued)

OTHER PUBLICATIONS

International Search Report, PCT International Patent Application No. PCT/EP2006/064663, dated Feb. 2, 2007.

*Primary Examiner* — Stefan Stoynov
(74) *Attorney, Agent, or Firm* — Kenyon & Kenyon LLP

(57) ABSTRACT

A method and a device for controlling a computer system having at least two execution units, switchover operations being carried out between at least two operating modes, and a first operating mode corresponding to a comparison mode and a second operating mode corresponding to a performance mode. At least one set of runtime objects is defined; at least one identifier is assigned to each runtime object of the defined set; and the identifier assigns at least the two operating modes to the runtime object.

25 Claims, 5 Drawing Sheets

U.S. PATENT DOCUMENTS

2007/0174683 A1* 7/2007 Gehring et al. .................. 714/12
2007/0245133 A1 10/2007 Weiberle et al.

FOREIGN PATENT DOCUMENTS

| JP | 63-175945 | 7/1988 |
| JP | 2002-116926 | 4/2002 |
| JP | 2005-92695 | 4/2005 |
| JP | 2007-508626 | 4/2007 |
| WO | WO 2005/045664 | 5/2005 |
| WO | WO 2007/017378 | 2/2007 |

* cited by examiner

METHOD AND DEVICE FOR CONTROLLING A COMPUTER SYSTEM

FIELD OF THE INVENTION

The present invention relates to a method and device for controlling a computer system.

BACKGROUND INFORMATION

In the field of embedded systems, for example in automotive engineering or automation engineering, an error in the µC hardware can potentially have safety-critical consequences in some applications. To avoid these consequences or minimize their effect, monitoring measures for detecting errors are employed. There are applications where such monitoring is required on a virtually permanent basis; in other applications, monitoring functions regularly check (i.e., periodically) or in response to specific prompts, whether the computer or other components as well are still functioning correctly.

German Published Patent Application No. 103 32 700 describes a method and a device for switching between two operating modes of a processor unit. The processor unit has at least two execution units, and the purpose of the different operating modes is to allow the processor unit to be operated at least in what is known as a performance mode, as well as in what is known as a comparison mode (CM). In the performance mode, various programs are executed on two execution units, for example. On the other hand, in the comparison mode, identical programs are executed on both execution units; the results generated by the two executions units are compared to one another; and, in the event of a discrepancy, an error signal is triggered.

From the standpoint of computing capacity, it is generally advantageous to allow as many tasks as possible to run in the most efficient mode possible (performance mode). On the other hand, in safety-critical applications in particular, virtually all tasks should be computed at a high level of error detection. Under the conventional arrangements, it is thus difficult or impossible to utilize a substantial share of the computing capacity of a performance mode for such applications.

Some applications have relatively complex error detection requirements. In numerous control engineering applications, a fault that is only active for a short duration, for example, is tolerated by the application itself; thus, in many situations, there is no error detection requirement for transient errors. However, there is such a requirement for permanent errors. Nevertheless, conventional arrangements do not provide any generally usable options for optimally resolving these conflicting requirements in terms of cost.

The time required for switching between the different operating modes (performance mode, comparison mode) is considerable. It is important that this overhead be taken into consideration when working with very frequent switchover operations. To allow for optimal strategies in the case of a scheduling problem, the application software requires that a more frequent changing of tasks be initiated, even in the short term.

SUMMARY

Example embodiments of the present invention provide a method which will enable switchover operations to be performed less frequently within a considered time interval, and thereby allow the computing time to be allocated to a greater degree to other tasks. It is intended that example embodiments of the present invention make it possible to optimize the number of switchover operations to be carried out between the modes and thereby economize on computing time.

Example embodiments of the present invention utilize the potential gain in the performance of a mode, i.e., to use as much computing capacity as possible in one performance mode.

Example embodiments provide a suitable implementation that meets the demands of SW tasks whose error detection requirements are mainly directed to the detection of permanent errors, while there is no need for detecting transient errors.

A method for controlling a computer system having at least two execution units is described, switchover operations being carried out between at least two operating modes, and a first operating mode corresponding to a comparison mode and a second operating mode corresponding to a performance mode, characterized in that at least one set of runtime objects is defined; at least one identifier is assigned to each runtime object of the defined set; and the identifier assigns at least the two operating modes to the runtime object.

A method is described, characterized in that the manner in which the identifier is employed provides that the operating mode not be switched at a predefinable or predefined point in time when the runtime object is executed in accordance with the identifier at that point in time.

A method is described, characterized in that the manner in which the identifier is employed provides for the runtime object to be executed at different times in different operating modes.

A method is described, characterized in that the manner in which the identifier is employed provides for the runtime object to be executed in an alternating process in different operating modes.

A method is described, characterized in that the identifier contains an information message indicating the maximum number of times a runtime object needs to be activated in one of the operating modes before it is to be executed in a different operating mode.

A method is described, characterized in that the identifier contains an information message indicating the number of times a runtime object needs to be activated in one predefinable operating mode before it is to be executed at least once in a predefinable comparison mode.

A method is described, characterized in that the identifier contains an information message indicating the minimum number of times a runtime object needs to be activated in one of the operating modes before it is to be executed in a different operating mode.

A method is described, characterized in that, to specify the operating mode in which a runtime object is to be executed at a predefinable or predefined point in time, an information message is employed indicating the operating mode in which the runtime object had previously been executed.

A method is described, characterized in that at least one portion of the information message is incremented or decremented.

A method is described, characterized in that, to specify the operating mode in which a runtime object is to be executed at a predefinable or predefined point in time, an information message is employed indicating the operating mode the computer system is currently in.

A method is described, characterized in that, to specify the operating mode in which a runtime object is to be executed at a predefinable or predefined point in time, the computer system employs an information message indicating the operating mode it is currently in.

A method is described, characterized in that, to specify the operating mode in which a runtime object is to be executed at a predefinable or predefined point in time, an information message is employed indicating the default level the computer system is currently in.

A method is described, characterized in that, to specify the mode in which a runtime object is to be executed at a predefinable or predefined point in time, an information message is employed indicating whether the computer system is currently in an initialization.

A method is described, characterized in that, to specify the mode in which a runtime object is to be executed at a predefinable or predefined point in time, an information message is employed indicating whether the computer system is currently in a test phase.

A device is advantageously provided for controlling a computer system having at least two execution units, including a switching device and a comparison device, switchover operations being carried out between at least two operating modes, and a first operating mode corresponding to a comparison mode and a second operating mode corresponding to a performance mode, characterized in that the device includes a memory device in which identifiers are stored for a defined set of runtime objects, the identifiers assign at least the two operating modes to each runtime object of the defined set.

A device is advantageously provided, characterized in that the design of this device provides for the identifier to be used in such a way that the operating mode is not switched at a predefinable or predefined point in time when the runtime object is executed in accordance with the identifier at that point in time.

A device is advantageously included, characterized in that the design of this device provides for the identifier to be employed in such a way that the runtime object is to be executed at different times in different operating modes.

A device is advantageously included, wherein the design of this device provides for the identifier to be employed in such a way that the runtime object is to be executed alternately in different operating modes.

A device is advantageously included, characterized in that its design provides for the identifier to contain an information message indicating the maximum number of times a runtime object needs to be activated in one of the operating modes before it is to be executed in a different operating mode.

A device is advantageously included, characterized in that its design provides for the identifier to contain an information message indicating the number of times a runtime object needs to be activated in one predefinable operating mode before it is to be executed at least once in a predefinable comparison mode.

A device is advantageously included, characterized in that its design provides for the identifier to contain an information message indicating the minimum number of times a runtime object needs to be activated in one of the operating modes before it is to be executed in a different operating mode.

A device is advantageously included, characterized in that its design provides that an information message be employed indicating the operating mode in which the runtime object had previously been executed in order to specify the operating mode in which a runtime object is to be executed at a predefinable or predefined point in time.

A device is advantageously included, characterized in that at least a portion of this information message is implemented via a counting device.

A device is advantageously included, characterized in that switching and/or comparison devices are provided which are designed to be capable of switching the operating modes as a function of the identifier and of other predefinable conditions.

The devices are advantageously included in a computer system.

Other features and aspects of example embodiments of the present invention are described in more detail below with reference to the appended Figures.

DETAILED DESCRIPTION

In the following, an execution unit may denote both a processor/core/CPU, as well as an FPU (floating point unit), a DSP (digital signal processor), a co-processor or an ALU (arithmetic logical unit).

Figure 1:
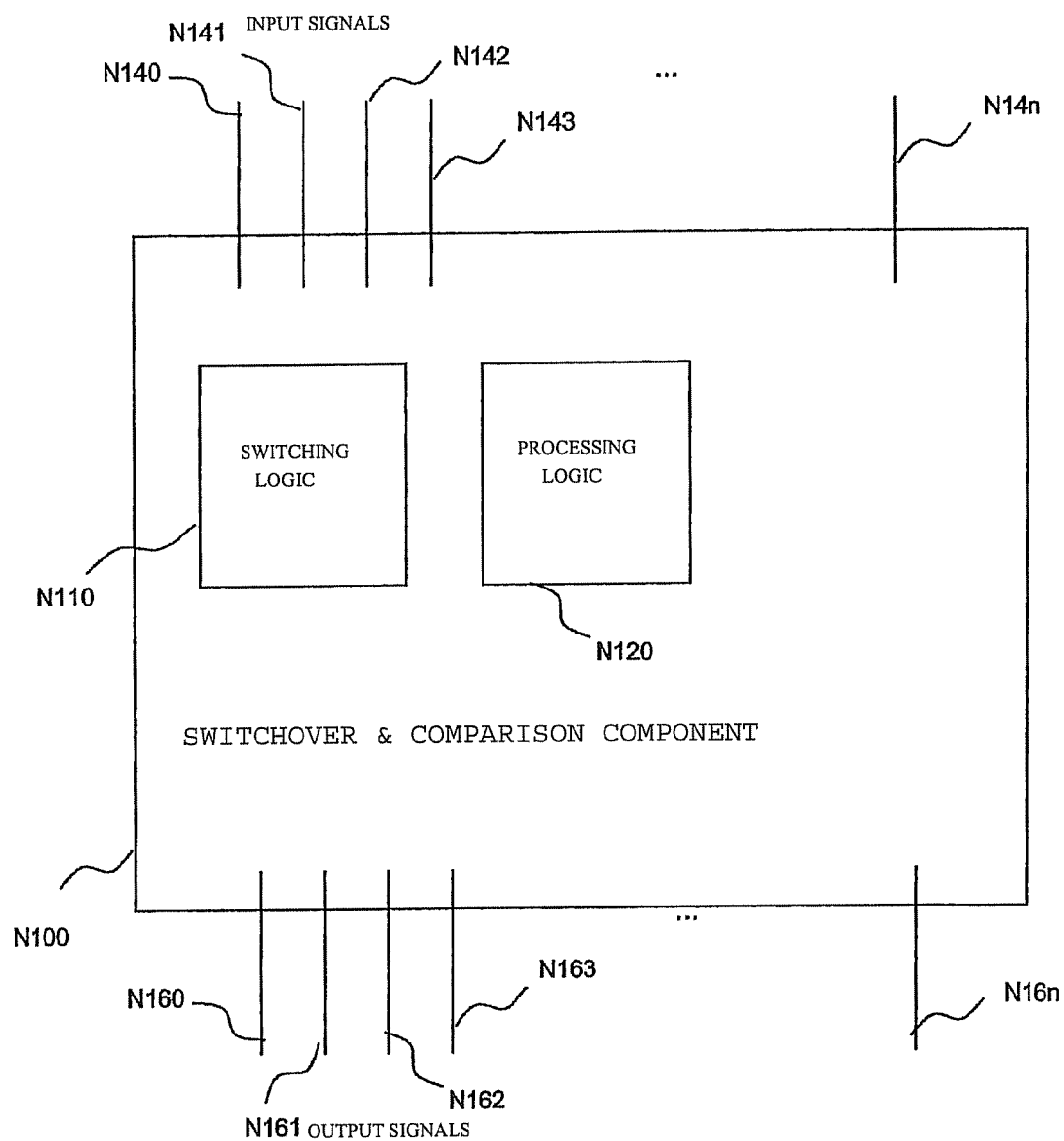
FIG. 1 shows a generalized representation of a switchover and comparison unit
Figure 5:
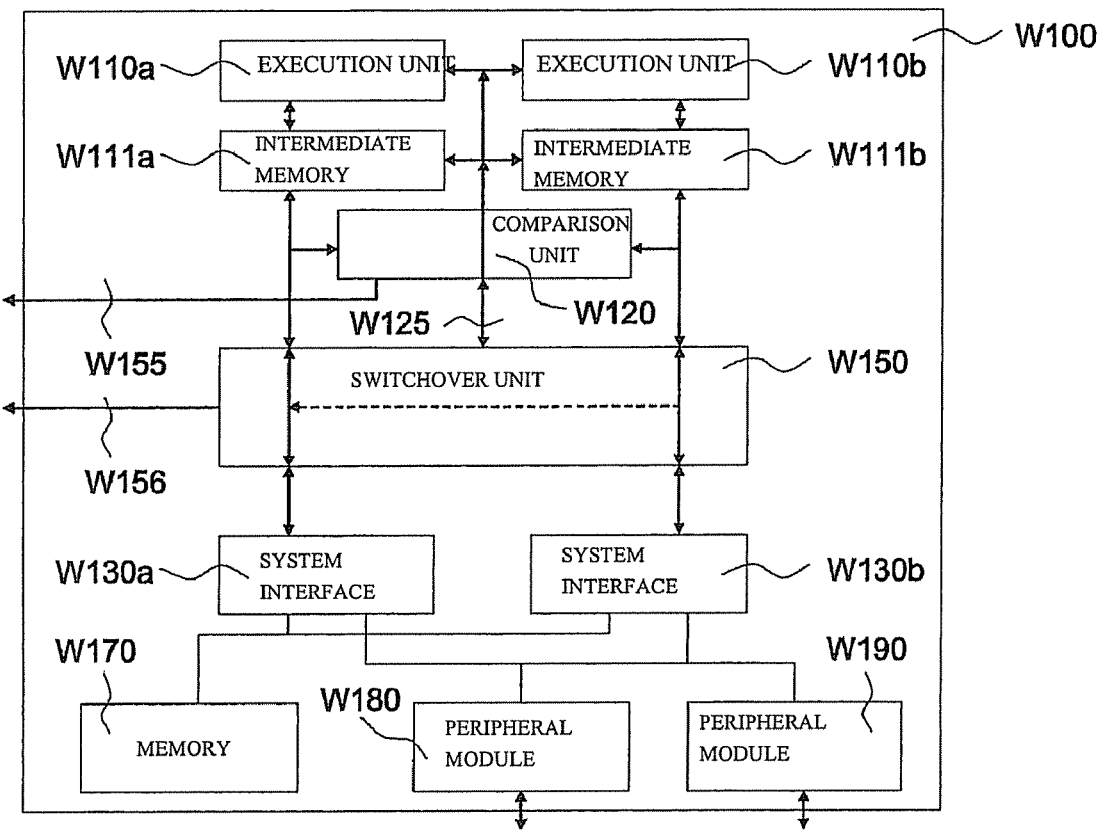
FIG. 5 shows a multiprocessor system having two execution units.

Example embodiments of the present invention relate to a multiprocessor system W100, as shown in FIG. 5, having at least two execution units W110a, W110b, a comparison unit W120, and a switchover unit W150. In this figure, the principle of a switchable multiprocessor system is described on the basis of a dual-processor system. Accordingly, the general case of a switching and comparison unit for more than two execution units is illustrated in FIG. 1. In this context, example embodiment of the present invention presented here always relates to the general case in which two or more execution units are involved. The execution units in FIG. 5 are each linked via an optional intermediate memory W111a, W111b to a comparison unit W120 and a switchover unit W150. Switchover unit W150 has at least two outputs to two system interfaces W130a, W130b. Via these interfaces, registers, memories or peripherals, such as digital outputs, D/A converters, and communications controllers, may be controlled. This multiprocessor system may be operated in at least two operating modes, one comparison mode CM and one performance mode PM. In a performance mode PM, different instructions, program segments or programs are executed in parallel in the different execution units. In this operating mode, the comparison unit is deactivated. In this operating mode, switchover unit W150 is configured in such a way that each execution unit is linked via the optional intermediate memory to one of system interfaces W130a, W130b. Via the system interfaces, a result obtained from an execution unit may be written to a memory W170 or output to a peripheral module W180, W190. A peripheral module may be an analog-digital converter or a communications controller of a communications system, for instance (i.e., SPI, LIN, CAN, FlexRay). There are several options for deactivating the comparison unit. First of all, a signal may be transmitted to the comparator, to activate or deactivate the same. To this end, an additional logic capable of effecting this is to be added to the comparator. Another option provides for not supplying any data for comparison to the comparator. A third option provides for ignoring the error signal of the comparator at the system level. In addition, the error signal itself may also be interrupted. Common to all of the options is that they generate a state in the system in which it is irrelevant when two or more data to be potentially compared, differ. If this state is reached by a measure in the comparator or in the input or output signals thereof, then the comparator is described as passive or deactivated. In a comparison mode CM, the same or substantially similar instructions, program segments or programs are processed in both execution units W110a, W110b. The output signals of the execution units are transmitted via optional intermediate memories W111a, W111b to comparison unit W120 and to switchover unit W150. The two data are checked for conformity in the comparison unit. Once the comparison is carried out, the switchover unit is informed via a status signal W125 whether it is allowed to output one of the corresponding results to one of the system interfaces or whether it is required to block the signal due to a detected discrepancy in the results. In such a case, an optional error signal W155 may be output by the comparison unit. Instead of being output by the comparison unit, this error signal may also be output by switchover unit W156. In this context, the switchover operation may be triggered by the execution of special switchover instructions, special instruction sequences, explicitly identified instructions or in response to the accessing of a specific memory address by at least one of the execution units of the multiprocessor system.

To begin with, FIG. 1 shows a generalized representation of a switchover and comparison unit, as should preferably be used. Of the n execution units to be considered, n signals N140, ..., N14n are transmitted to switchover and comparison component N100. From these input signals, this component is able to generate up to n output signals N160, ..., N16n. In the simplest case, the "pure performance mode," all signals N14i are routed to corresponding output signals N16i. In the opposite limiting case, the "pure comparison mode," all signals N140, ..., N14n are only routed to precisely one of output signals N16i.

This FIG. 1 illustrates how the various possible modes may be produced. To this end, the logic component of a switching logic N110 is included in FIG. 1. To begin with, it specifies how many output signals there actually are. In addition, switching logic N110 specifies which input signals contribute to which one of the output signals. In this context, one input signal may contribute to precisely one output signal. Formulated mathematically, the switching logic thus defines a function that assigns one element of set {N160, ..., N16n} to each element of set {N140, ..., N14n}.

For each of outputs N16i, processing logic N120 then establishes the form in which the inputs contribute to this output signal. To describe the different possible variations exemplarily, it is assumed, without limiting universality, that output N160 is generated by signals N141, ..., N14m. If m=1, this simply corresponds to the signal being switched through; if m=2, then signals N141, N142 are compared. This comparison may be implemented synchronously or asynchronously; it may be performed on a bit-by-bit basis, or only for significant bits or also using a tolerance range.

In the case that $m \geq 3$, a plurality of options is provided. One first option provides for comparing all of the signals, and, in response to the existence of at least two different values, for an error to be detected, which may optionally be signaled. A second option provides for making a k-out-of-m selection (k>m/2). This may be implemented through the use of comparators. An error signal may be optionally generated if it is ascertained that one of the signals is deviant. A potentially different error signal may be generated if all three signals differ. A third option provides for feeding these values into an algorithm. This may take the form of generating an average value, a median value, or of using a fault-tolerant algorithm (FTA), for example. Such an FTA is based on deletion of the extreme values of the input values and on a type of averaging of the remaining values. This averaging may be performed for the entire set of the remaining values or preferably for a subset that is easily formed in HW. In such a case, it is not always necessary to actually compare the values. In the averaging operation, it is merely necessary to add and divide, for example; FTM, FTA or median value require partial sorting. If indicated, an error signal may be optionally output here as well, given high enough extreme values.

For the sake of brevity, these various mentioned options for processing a plurality of signals to form one signal are described as comparison operations.

Thus, the task of the processing logic is to establish the exact form of the comparison operation for each output signal, and thus also for the corresponding input signals. The combination of the information of switching logic N110 (i.e., the function named above) and of the processing logic (i.e., stipulating the comparison operation per output signal, i.e., per functional value) is the mode information, and this determines the mode. Generally, this information is multi-valued, i.e., not representable by only one logic bit. Not all theoretically possible modes are practical in a given implementation; preferably, the number of permitted modes will be limited. It is important to note that, in the case of only two execution units, where there is only one comparison mode, the entire information may be condensed into only one logic bit.

A switch from a performance mode to a comparison mode is generally characterized in that execution units, which, in the performance mode, are mapped to different outputs, are mapped to the same output in the comparison mode. This is preferably implemented in that a subsystem of execution units is provided, in which, in the performance mode, all input signals N14i, which are to be considered in the subsystem, are directly switched to corresponding output signals N16i, while, in the comparison mode, they are all mapped to an output. Alternatively, such a switchover operation may also be implemented by modifying pairings. The explanation for this is that, generally, it is not possible to speak of the performance mode and the comparison mode, although, in an example embodiment of the present invention, the number of permitted modes may be limited in such a way that this general case does apply. However, it is always possible to speak of a switch from a performance mode to a comparison mode (and vice versa).

Software-controlled switchover operations between these modes may be dynamically carried out during operation. In this context, the switchover operation is triggered by the execution of special switchover instructions, special instruction sequences, explicitly identified instructions or in response to the accessing of specific addresses by at least one of the execution units of the multiprocessor system.

First, a basic aspect is to be described. To coordinate the switchover operation between different modes of the processor, one approach provides for grouping different software modules to form runtime objects, to which computing time is then allotted by the operating system. Each of these runtime objects includes, inter alia, an identifier indicating the mode in which it is to be executed. When this runtime object is allotted computing time by the operating system, if the need arises, the mode switchover is then initiated at the same time by the operating system.

An aspect of example embodiments of the present invention is the option of assigning runtime objects a special identifier signifying that the mode the processor system is in at a given point in time will not be switched when the runtime object having this special identifier is allotted computing time at that particular point in time. The runtime object is executed in the currently active mode.

Another aspect is the option of assigning a special identifier to the runtime object stipulating that the runtime object is to be executed alternately in different modes. An indication may also be optionally provided as to the number of activations in one of the modes after which a switch is to be made to a different mode, and to which mode.

In another example embodiment, a special identifier is assigned to a runtime object stipulating that it be executed at least once (m times) in a different mode following at least n executions in the one mode.

These options may also be combined.

A runtime object is assigned a special identifier stipulating that it be executed in one specific comparison mode in only one specific system default level. In this connection, the system default level denotes a separate mode of the overall system.

A runtime object is assigned a special identifier stipulating that it be executed in one specific comparison mode only during the initialization.

A runtime object is assigned a special identifier stipulating that it be executed in one specific comparison mode during a specific test phase in the operation. This test phase may occur periodically, for example (i.e., every 10 ms) or in response to a prompt.

The identifiers are advantageously stored in memories.

The aspects listed above are described in greater detail in the following with reference to the figures.

Figure 2:
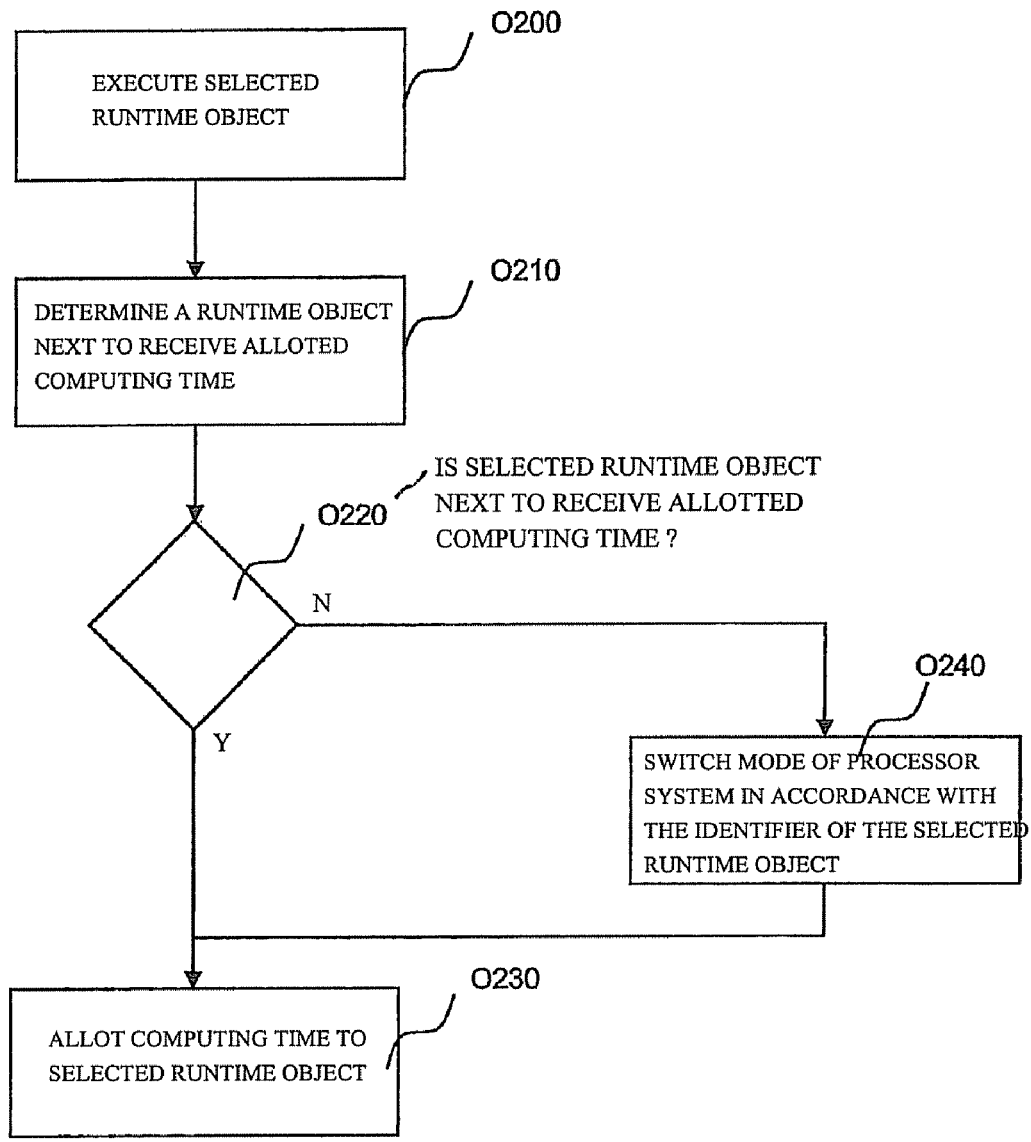
FIG. 2 illustrates the functional sequence for assigning a mode for the case that a runtime object receives a special identifier signifying that the mode the processor system is currently in will not be switched when the runtime object having this special identifier is allotted computing time.

FIG. 2 illustrates the functional sequence for the case that a runtime object receives a special identifier signifying that the mode that the processor system is in at a given point in time will not be switched when the runtime object having this special identifier is allotted computing time at that particular point in time. This means that the runtime object is executed in the currently active mode.

A given runtime object is executed in step O200. In step O210, the scheduler is invoked to determine a runtime object that is the next to receive computing time allotted thereto. In next step O220, a determination is made as to whether the runtime object has this special type of identifier. If the determination is affirmative, computing time is allotted to the runtime object in step O230. If the runtime object does not have this special type of identifier, the mode of the processor system is switched in step O240 in accordance with the identifier of the runtime object, and computing time is allotted to the runtime object in step O230.

In another example embodiment, a runtime object is assigned a special identifier stipulating that it be executed at least once (m times) in a different mode, following at least n executions in the one mode. These example embodiments may also be combined with one another or with the method described with reference to FIG. 2.

Figure 3:
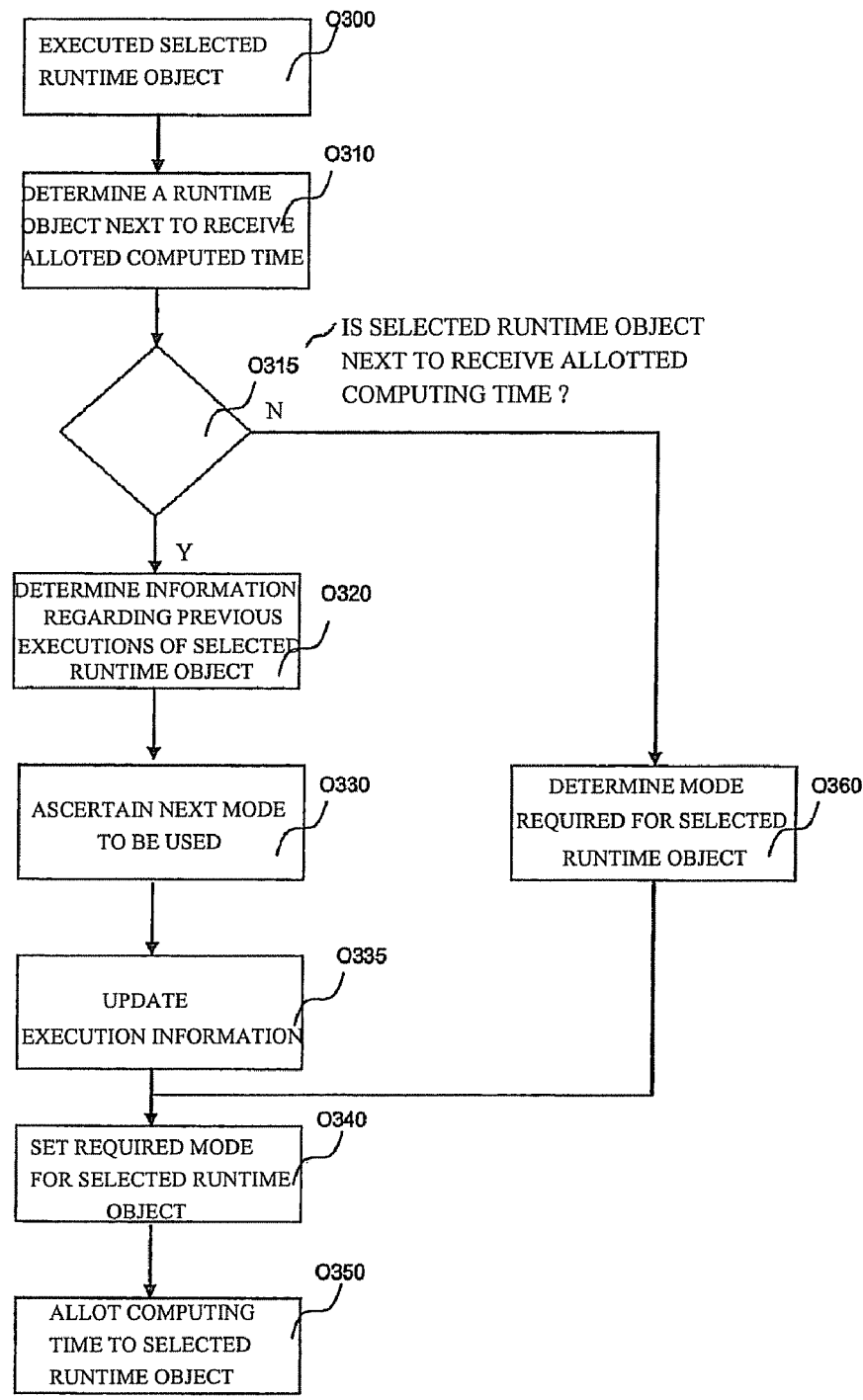
FIG. 3 illustrates the functional sequence for assigning a mode for the case that the runtime object receives a special identifier stipulating that the runtime object is to be executed alternately in a plurality of modes.

FIG. 3 describes other example embodiments. In an example embodiment, a runtime object receives a special identifier stipulating that the runtime object is to be executed alternately in both modes. An indication may also be optionally provided as to the number of activations in one of the modes after which a switch is to be made to a different mode, and to which mode.

To begin with, a given runtime object is executed in step O300. In step O310, the scheduler is invoked to determine a runtime object that is the next to receive computing time allotted thereto. A determination is made in step O315 as to what type of identifier the runtime object has. If the runtime object has this special type of identifier, information regarding previous executions of this runtime object is then ascertained in step O320. In one preferred implementation, this information is stored as one or a plurality of counter contents, optionally coupled to corresponding mode information. One option for a counter-content implementation provides that a counter be assigned to such an execution object for each of its allowed modes, to count the number of times that it was executed in this mode. The counters may optionally be subject to a reset that is time-triggered or triggered by other conditions. This implementation is advantageous when it is to be ensured for the runtime object, for example, that, of n executions, it is to carry out n1 in mode 1, n2 in mode 2, n3 in mode 3, . . . . The counter may then be advantageously reset subsequently to n executions. Another optional implementation for the counter contents is for only one counter content to be stored. This is especially advantageous when there are only two permitted modes. The counter then counts, for example, how often the runtime object was executed in mode 1. Alternatively, the counter counts how often the runtime object was executed in the mode that was used the last time.

From this information, the next mode to be used is ascertained in step O330. In the case that information pertaining to counters and corresponding mode information are implemented, there are a multiplicity of algorithms that may be used in order to determine the next permitted mode. A first example embodiment provides for all executions that are to be implemented in mode 1 within a period of time to first be carried out, then all in mode 2, etc. This is always varied cyclically in a second example embodiment. In a third example embodiment, relative to the default level of the modes, that mode which had the lowest level in the course of the previous executions is selected. In a fourth example embodiment, the current mode information is included, and that mode being used at the moment is preferably selected. In last step O335, the information pertaining to the execution, for example the counter contents, is updated.

In step O340, the relevant required mode is then set for the runtime object in the processor system, and the requisite resources in terms of computing time are then allotted to the runtime object in step O350.

If the determination is made in step O315 that the runtime object does not have the special identifier, the mode required for this object is determined in step O360, and the process continues with step O340.

The method described here makes it possible, for example, in the case of only two possible modes, to execute a given runtime object, for example, nine of ten times in the performance mode and only once in the comparison mode. On the one hand, this allows optimal utilization of the performance mode. On the other hand, it also allows an implementation of the runtime objects that meets the particular requirements. In particular, this makes it possible for an error recognition to differentiate between permanent errors and transient errors, and the implementation allows an error recognition strategy to be employed mainly for permanent errors, while a strategy of resilience or fault toleration may be employed for transient errors.

Figure 4:
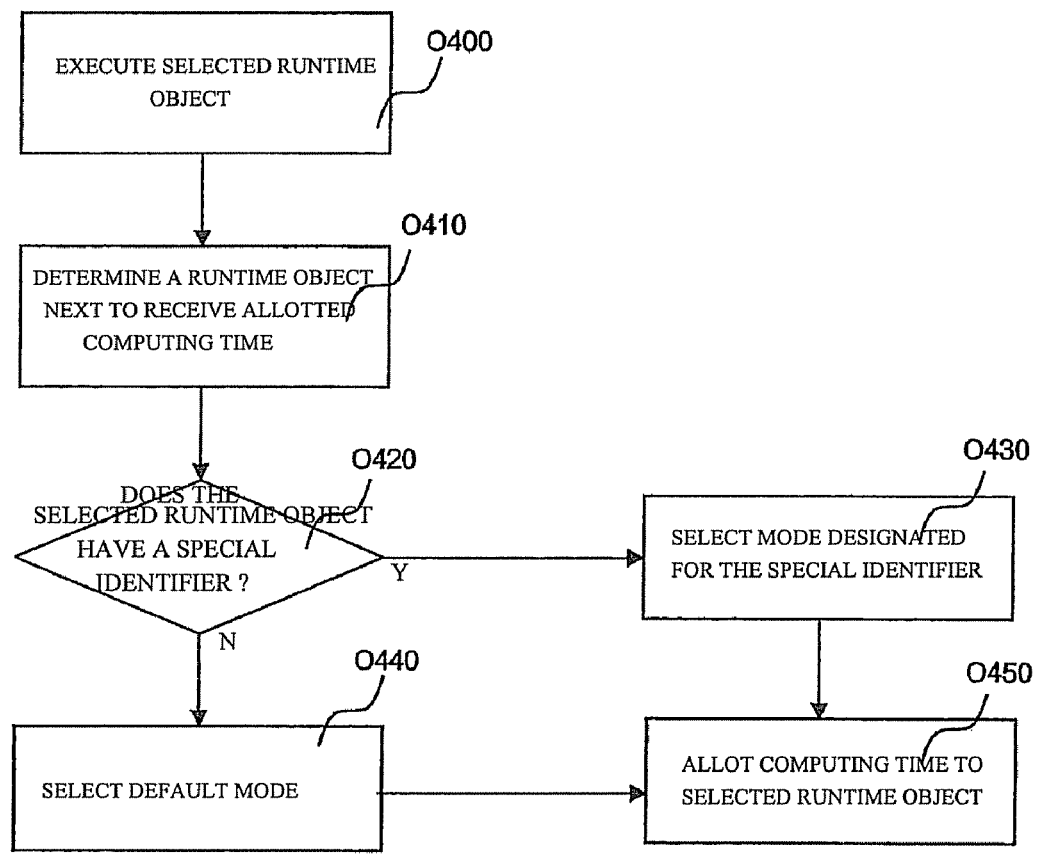
FIG. 4 shows the functional sequence when the assignment of a mode is coupled to specific system modes.

The coupling of this aspect to specific system modes is illustrated in FIG. 4. An aspect is that a runtime object be assigned a special identifier stipulating that it be executed in one specially designated mode only under specific system conditions. In one system default level, for example, a special comparison mode should always be used. This may apply correspondingly to an initialization or to a special test phase which occurs periodically, for example (i.e., every 10 ms) or in response to a prompt.

TO BEGIN WITH, A GIVEN RUNTIME OBJECT IS EXECUTED IN STEP O400. IN STEP O410, THE SCHEDULER IS INVOKED TO DETERMINE A RUNTIME OBJECT THAT IS THE NEXT TO RECEIVE COMPUTING TIME ALLOTTED THERETO. IT IS SUBSEQUENTLY CHECKED IN STEP O420 TO DETERMINE WHETHER THIS RUNTIME OBJECT HAS THE SPECIAL IDENTIFIER AND WHETHER ONE OF THE SPECIAL CONDITIONS EXISTS. AS JUST DESCRIBED, THESE CONDITIONS MAY BE DUE TO AN INITIALIZATION, A DEFAULT LEVEL OR A TEST PHASE, FOR EXAMPLE. IF SUCH A SPECIAL CONDITION EXISTS, THE MODE DESIGNATED THEREFOR IS SET IN THE PROCESSOR SYSTEM IN STEP O430. IF THIS IS NOT THE CASE, IN STEP O440, A DEFAULT MODE IS SELECTED, OR ONE OF THE ALGORITHMS MENTIONED IN THE DESCRIPTION OF FIG. 3 IS USED. IN BOTH CASES, COMPUTING TIME IS SUBSEQUENTLY ALLOTTED TO THE RUNTIME OBJECT IN STEP O450.

What is claimed is:

1. A method for controlling a computer system having at least two execution units, comprising:
    performing a switchover operation between at least two operating modes, a first operating mode corresponding to a comparison mode and a second operating mode corresponding to a performance mode;
    defining at least one set of runtime objects; and
    assigning at least one identifier to each runtime object of the defined set;
    wherein the identifier assigns at least the two operating modes to the runtime object.

2. The method according to claim 1, wherein a manner in which the identifier is employed provides that the operating mode is not switched at one of (a) a predefinable and (b) a predefined point in time when the runtime object is executed in accordance with the identifier at that point in time.

3. The method according to claim 1, wherein a manner in which the identifier is employed provides for the runtime object to be executed at different times in different operating modes.

4. The method according to claim 1, wherein a manner in which the identifier is employed provides for the runtime object to be executed alternately in different operating modes.

5. The method according to claim 1, wherein the identifier includes an information message indicating a maximum number of times a runtime object needs to be activated in one of the operating modes before it is to be executed in a different operating mode.

6. The method according to claim 1, wherein the identifier includes an information message indicating a number of times a runtime object needs to be activated in one predefinable operating mode before it is to be executed at least once in a predefinable comparison mode.

7. The method according to claim 1, wherein the identifier includes an information message indicating a minimum number of times a runtime object needs to be activated in one of the operating modes before it is to be executed in a different operating mode.

8. The method according to claim 1, wherein, to specify the operating mode in which a runtime object is to be executed at one of (a) a predefinable and (b) a predefined point in time, an information message is employed indicating the operating mode in which the runtime object had previously been executed.

9. The method according to claim 8, wherein at least one portion of the information message is one of (a) incremented and (b) decremented.

10. The method according to claim 1, wherein, to specify the operating mode in which a runtime object is to be executed at one of (a) a predefinable and (b) a predefined point in time, an information message is employed indicating the operating mode the computer system is currently in.

11. The method according to claim 1, wherein, to specify the operating mode in which a runtime object is to be executed at one of (a) a predefinable and (b) a predefined point in time, the computer system employs an information message indicating the operating mode it is currently in.

12. The method according to claim 1, wherein, to specify the operating mode in which a runtime object is to be executed at one of (a) a predefinable and (b) a predefined point in time, an information message is employed indicating the default level the computer system is currently in.

13. The method according to claim 1, wherein, to specify the mode in which a runtime object is to be executed at one of (a) a predefinable and (b) a predefined point in time, an information message is employed indicating whether the computer system is currently in an initialization.

14. The method according to claim 1, wherein, to specify the mode in which a runtime object is to be executed at one of (a) a predefinable and (b) a predefined point in time, an information message is employed indicating whether the computer system is currently in a test phase.

15. A device for controlling a computer system having at least two execution units, comprising:
    a switching device and a comparison device configured to perform switchover operation between at least two operating modes, a first operating mode corresponding to a comparison mode and a second operating mode corresponding to a performance mode; and
    a memory device configured to store identifiers for a defined set of runtime objects, the identifiers assigning at least the two operating modes to each runtime object of the defined set.

16. The device according to claim 15, wherein the device is arranged to provide for the identifier to be used such that the operating mode is not switched at one of (a) a predefinable and (b) a predefined point in time when the runtime object is executed in accordance with the identifier at that point in time.

17. The device according to claim 15, wherein the device is arranged to provide for the identifier to be employed such that the runtime object is to be executed at different times in different operating modes.

18. The device according to claim 15, wherein the device is arranged to provide for the identifier to be employed such that the runtime object is to be executed alternately in different operating modes.

19. The device according to claim 15, wherein the device is arranged to provide for the identifier to include an information message indicating a maximum number of times a runtime object needs to be activated in one of the operating modes before it is to be executed in a different operating mode.

20. The device according to claim 15, wherein the device is arranged to provide for the identifier to include an information message indicating a number of times a runtime object needs to be activated in one predefinable operating mode before it is to be executed at least once in a predefinable comparison mode.

21. The device according to claim 15, wherein the device is arranged to provide for the identifier to include an information message indicating a minimum number of times a runtime object needs to be activated in one of the operating modes before it is to be executed in a different operating mode.

22. The device according to claim 15, wherein the device is arranged to provide that an information message is employed indicating the operating mode in which the runtime object had previously been executed in order to specify the operating mode in which a runtime object is to be executed at one of (a) a predefinable and (b) a predefined point in time.

23. The device according to claim 22, wherein at least a portion of the information message is implemented via a counting device.

24. The device according to claim 15, wherein at least one of (a) a switching and (b) a comparison device are provided which are configured to be capable of switching the operating modes as a function of the identifier and of other predefinable conditions.

25. A computer system, comprising:
   a device for controlling the computer system having at least two execution units, including:
     a switching device and a comparison device configured to perform switchover operation between at least two operating modes, a first operating mode corresponding to a comparison mode and a second operating mode corresponding to a performance mode; and
   a memory device configured to store identifiers for a defined set of runtime objects, the identifiers assigning at least the two operating modes to each runtime object of the defined set.

* * * * *